United States Patent
Hutchinson et al.

(10) Patent No.: US 7,561,753 B2
(45) Date of Patent: Jul. 14, 2009

(54) SYSTEM AND METHOD FOR COMPARING IMAGES WITH DIFFERENT CONTRAST LEVELS

(75) Inventors: Michael C. Hutchinson, Kent, WA (US); Michael D. Horky, Kent, WA (US); Mark A. Lee, Kent, WA (US); William D. Meade, Tacoma, WA (US); James C. Kennedy, Renton, WA (US); Thomas E. Riechers, Sumner, WA (US); Michael J. Duncan, Sumner, WA (US)

(73) Assignee: The Boeing Company, Chicago, IL (US)

( * ) Notice: Subject to any disclaimer, the term of this patent is extended or adjusted under 35 U.S.C. 154(b) by 814 days.

(21) Appl. No.: 11/018,840

(22) Filed: Dec. 21, 2004

(65) Prior Publication Data
US 2005/0152615 A1 Jul. 14, 2005

Related U.S. Application Data

(60) Provisional application No. 60/535,358, filed on Jan. 9, 2004.

(51) Int. Cl.
G06K 9/00 (2006.01)
G06K 9/40 (2006.01)
G06K 9/54 (2006.01)
G06K 9/60 (2006.01)
G09G 5/00 (2006.01)
G09G 5/02 (2006.01)
H04N 5/202 (2006.01)

(52) U.S. Cl. .................. 382/274; 382/128; 382/169; 382/305; 345/591; 348/254

(58) Field of Classification Search ................ 382/128, 382/132, 141, 149, 152, 168–169, 274; 345/589, 345/591; 348/254
See application file for complete search history.

(56) References Cited

U.S. PATENT DOCUMENTS

| 4,868,651 | A |   | 9/1989  | Chou et al.            |
|-----------|---|---|---------|------------------------|
| 4,975,970 | A |   | 12/1990 | Zettel et al.          |
| 5,164,933 | A | * | 11/1992 | Matsueda ....... 369/59.18 |
| 5,970,164 | A | * | 10/1999 | Bamberger et al. ...... 382/128 |

(Continued)

FOREIGN PATENT DOCUMENTS

| EP | 0 548 527 A2 | 6/1993  |
| EP | 1 253 557 A1 | 10/2002 |
| GB | 1 437 161 A  | 5/1976  |
| WO | WO 95/31869  | 11/1995 |

OTHER PUBLICATIONS

Wagenknecht et.al., "Dynamic Programming Algorithm for Contrast Correction in Medical Images", Proceedings of SPIE—vol. 3961, Nonlinear Image Processing XI, Mar. 2000, pp. 216-226.*

(Continued)

*Primary Examiner*—Matthew C Bella
*Assistant Examiner*—Nathan Bloom
(74) *Attorney, Agent, or Firm*—Toler Law Group

(57) ABSTRACT

Methodologies and systems to compare images with different levels of contrast are provided. Contrast is normalized between the images with different contrast levels and brightness is set. When normalizing contrast a derivative of gray level is determined for a first digital image having a first contrast level, and a derivative of gray level is determined for a second digital image having a second contrast level that is greater than the first contrast level. A ratio of the derivative of gray level for the first digital image to the derivative of gray level for the second digital image is determined, and the derivative of gray level for the first digital image is equalized with the derivative of gray level for the second digital image. Brightness of at least one image may be set automatically, such as by calculating an average pixel value excluding background and text, or manually.

29 Claims, 10 Drawing Sheets

U.S. PATENT DOCUMENTS

| | | | | |
|---|---|---|---|---|
| 5,982,915 | A * | 11/1999 | Doi et al. | 382/130 |
| 6,580,779 | B2 * | 6/2003 | Avinash et al. | 378/98.9 |
| 6,868,364 | B2 * | 3/2005 | Allerding et al. | 702/174 |
| 7,054,473 | B1 * | 5/2006 | Roehrig et al. | 382/128 |
| 2003/0161518 | A1 * | 8/2003 | Vuylsteke | 382/128 |
| 2003/0228042 | A1 * | 12/2003 | Sinha | 382/131 |

OTHER PUBLICATIONS

Lehman et. al., "Computer-based registration for digital subtraction in dental radiology", Dentomaxillofac Radiol Jan. 2001;30(1):64, Institute of Medical Informatics, Aachen University of Technology (RWTH), Aachen, Germany.*

Likar Bostjan et al., "Evaluation of three contrast correction methods for digital subtraction in dental radiography: An in vitro study", Medial Physics, American Institute of Physics, New York, vol. 24, No. 2, Feb. 1997, ISSN 0094-2405, pp. 299-307.

Reynolds, R.A.; Wyatt E.D.; and Peterson, M.A. "Segmentation for 3-D Display", IEEE Colloquium on Image Processing in Medicine, London, 1991, pp. 8/1-8/7.

"Digital Reference Radiographs Offer Possible Savings", Michael Hutchinson, ASTM Standardization News, Oct. 2003, http://www.astm.org/cgi-bin/SoftCart.exe/SNEWS/OCTOBER_2003/hutchinson_oct03.html?L+mystore+acgt0623.

* cited by examiner

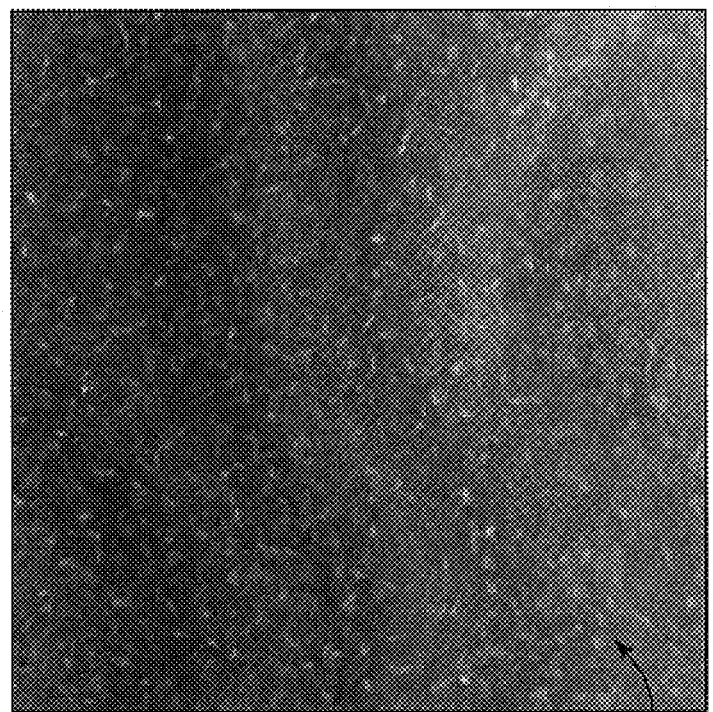
*FIG. 1* (PRIOR ART) ⌐10
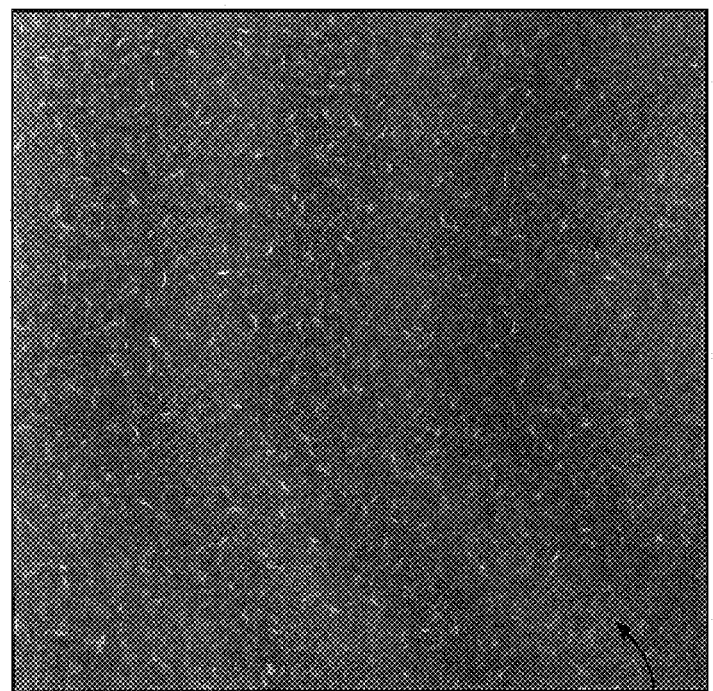
*FIG. 2* (PRIOR ART) ⌐20

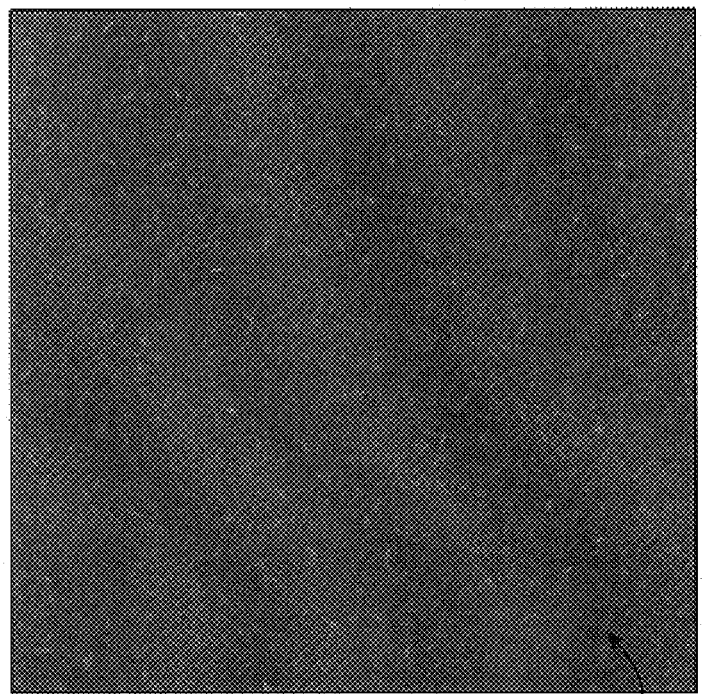
FIG. 3 *(PRIOR ART)* —30
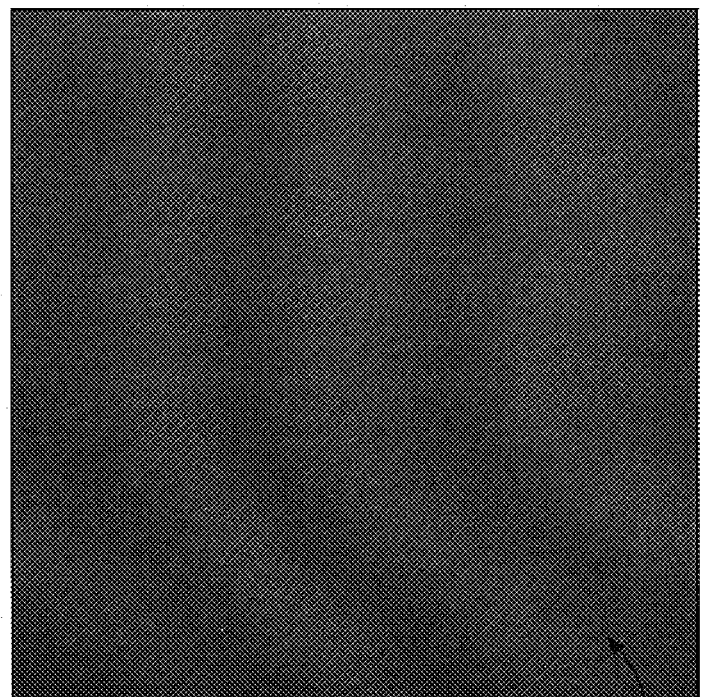
FIG. 4 *(PRIOR ART)* —40

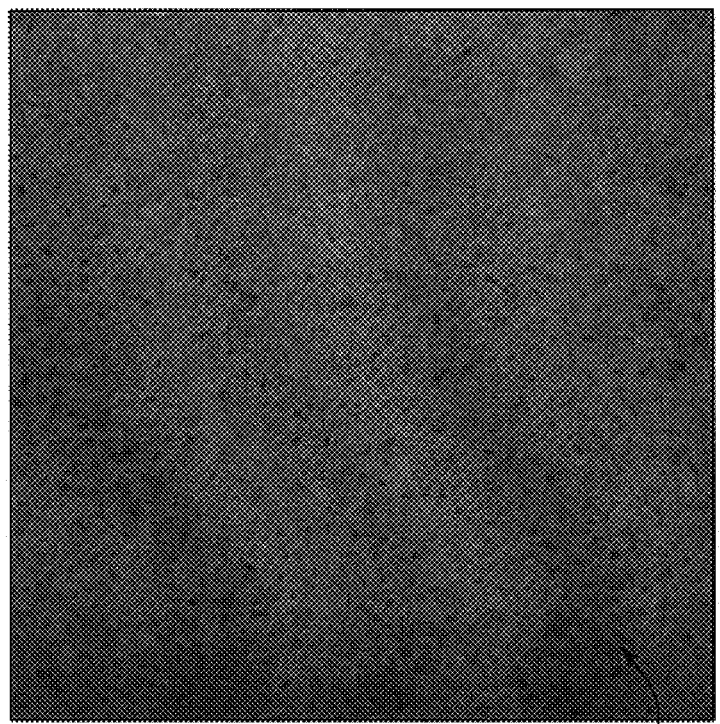
*FIG. 5* (PRIOR ART) ⎯50
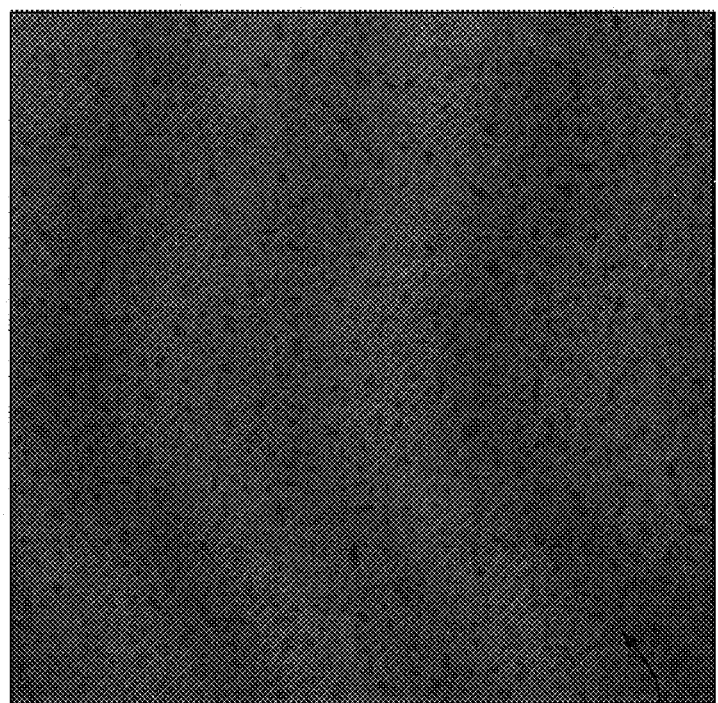
*FIG. 6* (PRIOR ART) ⎯60

SYSTEM AND METHOD FOR COMPARING IMAGES WITH DIFFERENT CONTRAST LEVELS

CROSS-REFERENCE TO RELATED APPLICATIONS

This Application is a Non-Prov of Prov (35 USC 119(e)) application 60/535,358 filed on Jan. 9, 2004.

FIELD OF THE INVENTION

This invention relates generally to non-destructive evaluation and, more specifically, to digital radiography.

BACKGROUND OF THE INVENTION

Non-destructive evaluation (NDE) is well known for inspecting parts or materials for defects such as porosity or inclusions like gas bubbles or foreign material. For example, x-rays are used for NDE of manufactured parts for systems such as piping systems, structures, and vehicles, such as ships, land vehicles, and air vehicles such as aircraft and spacecraft. As a further and more specific example, because aluminum castings are used extensively in aircraft manufacturing, inspection costs for NDE of aluminum castings represent a significant percentage of total inspection costs for an aircraft.

Such use of x-rays is sometimes referred to as radiography. Traditionally, radiography techniques entailed placing a part to be examined for defects between an x-ray source and a silver-halide film. However, traditional silver-halide film techniques are costly and time-consuming.

A reduction in costs and time associated with traditional silver-halide film techniques has been achieved with digital radiography techniques. Digital radiography encompasses a wide range of technologies, including flat panel technologies, computed radiography, and a variety of scintillator and digital camera-based technologies. In switching from traditional film radiography to digital radiography, costs associated with purchasing film, processing film, and chemical waste disposal can be eliminated. In addition, significant savings can be realized through cycle time reduction and automation that digital radiography offers.

A major hurdle to implementation of digital radiography for a number of industrial uses is a lack of digital reference images. Many differences result in a radiographic image captured on film versus a radiographic image captured by any of the numerous digital modalities currently available. As a result, direct comparison of digital radiographs to current reference radiographs captured on film leads to different characterizations of severity levels between the various digital modalities and between digital and film radiography.

An attempt has been made within the aluminum casting industry to address these differences by converting existing film reference radiographs (ASTM E155 Reference Radiographs for Inspection of Aluminum and Magnesium Castings) to digital images. However, traditional film reference radiographs such as ASTM E155 do not translate directly into the domain of digital radiography. The existing reference radiographs have proved inadequate for two main reasons: (1) the difference in spatial resolution between radiographic film and the digital radiographic systems; and (2) the difference in dynamic range between film and many of the digital detectors.

Regarding the first shortcoming in use of existing film reference radiographs, the grain size of common radiographic film ranges in size from about 3 microns (µm) to about 10 µm, while pixel spacing for digital radiographic systems that are suitable for inspection of aluminum castings, without use of geometric magnification, range from about 50 µm to about 139 µm. These differences in resolution do not seem to affect the detection of a discontinuity. However, these differences in resolution do affect the grading of the severity level of a discontinuity. For example, FIG. 1 is a film radiograph 10 of plate three of elongated porosity ¼" (ASTM E155) that was digitized with a pixel spacing of 140 µm; FIG. 2 is a film radiograph 20 of plate five of the same series digitized with a pixel spacing of 50 µm; and FIG. 3 is a film radiograph 30 that is the same as the film radiograph 10 (FIG. 1) only digitized at 50 µm. It can be seen through a comparison of the film radiographs 10, 20, and 30 that a difference in resolution of a detector (or in this case digitization pixel size) between 50 µm and 140 µm results in a shift of approximately two plates in the apparent severity level.

Regarding the second shortcoming in use of existing film reference radiographs, the difference in dynamic range between film and many of the digital detectors has shown that use of ASTM E155 reference radiographs is inadequate for the grading of the severity level of aluminum castings. The wide dynamic range of digital detectors, coupled with the limitation on a number of gray level intensities that humans can differentiate, makes it necessary to step through the data of a given image with a series of windows. This is currently done by adjusting the contrast (window width) and then changing the brightness (window level) in a series of steps to view the data.

The shortcoming with this approach arises when the contrast of a production radiograph taken with a digital detector is adjusted. When using a high contrast, the discontinuity looks worse (that is, a higher plate number). When using a low contrast, the discontinuity may not be visible at all. For example, this effect is shown in FIGS. 4-6. All of the images are from a single 16 bit dynamic range digital radiograph of the ASTM E155 hardware for ¼" elongated porosity in aluminum. FIGS. 4 and 6 are digital radiographs 40 and 60, respectively, with the same contrast setting and FIG. 5 is a digital radiograph 50 at a slightly higher contrast setting. In comparing the digital radiograph 40 (FIG. 4) to the digital radiograph 50 (FIG. 5), there is a noticeable difference even though they are both of plate two and from the same radiograph. Instead, the digital radiograph 50 (FIG. 5) looks more like the digital radiograph 60 (FIG. 6). However, the digital radiograph 60 (FIG. 6) is of plate seven—a difference of five severity levels from plate 2 (see FIGS. 4 and 5).

Because it has not been possible to normalize contrast of the standard reference image relative to the part's image using known methods, direct comparisons between the standard reference image and the part's image have not been possible. Development of digital reference images is therefore required to capture the savings offered by digital radiography. However, there is an unmet need in the art for methodologies to use a set of digital reference images.

SUMMARY OF THE INVENTION

Embodiments of the present invention provide methodologies and systems to compare images with different contrast levels. Contrast is normalized between images with different contrast levels and brightness is set. Advantageously, embodiments of the present invention permit electronic digital reference images to be used with non-film x-ray inspection systems. As a result, use of the present invention can significantly reduce costs associated with set up time and costs associated with film, such as costs for film storage, processing, and chemical disposal. Moreover, embodiments of the present invention may be used to compare any digital images—not just images obtained via radiography.

In one exemplary application, electronic digital reference images allow inspection of aluminum production castings using non-film digital technology. The digital reference images are usable in place of current ASTM E155 reference radiographs when viewing digital radiographs of aluminum castings. Advantageously, this allows use of digital radiography for aluminum castings without changing classification of aluminum castings as compared to traditional film radiography using ASTM E155 in a statistically significant way.

According to an embodiment of the present invention, images with different levels of contrast are compared. Contrast is normalized between the images with different contrast levels and brightness is set. According to an aspect of the present invention, when normalizing contrast a derivative of gray level is determined for a first digital image having a first contrast level, and a derivative of gray level is determined for a second digital image having a second contrast level that is greater than the first contrast level. A ratio of the derivative of gray level for the first digital image to the derivative of gray level for the second digital image is determined, and the derivative of gray level for the first digital image is equalized with the derivative of gray level for the second digital image. According to another aspect of the present invention, brightness may be set manually or automatically.

According to an aspect of the present invention, the first digital image may be a digital reference image and the second digital image may be a production digital radiograph of an imaged part. Advantageously, this normalization of contrast allows for determination of the severity level of a discontinuity—regardless of the digital modality used or the bit depth of the digital modality. The contrast of the reference image is adjusted to match the contrast of the production image that may have been generated by a different modality than the reference image. This matching of contrast between a reference image and an "unknown" image allows for a meaningful comparison between the two images.

According to aspects of the present invention, a derivative of gray level may be determined with respect to any variable as desired. For example, a derivative of gray level may be determined with respect to thickness. An operator may calculate a change in gray (for example, on a monitor) versus change in thickness of a known material displayed in the second image, such as a production image. This change in gray is calculated using at least two known thicknesses of a known material that are close to or that bracket the thickness of interest. The normalization proceeds by calculating the ratio of the rate of change of gray versus thickness for the first image, such as the reference image, to the rate of change of gray versus thickness for the second image, such as the production image. This ratio is then multiplied by the current image window width of the first image, such as the reference image, to produce the window width that results in a normalized contrast between the two images. According to further aspects of the present invention, any function may be performed that defines a derivative of the gray level, such as a logarithmic function or a polynomial fit function. In addition, a non-uniform look-up table may be used.

According to additional aspects of the present invention, brightness may be set manually or automatically. Brightness may be set manually by adjusting window level. Brightness may be set automatically by calculating an average pixel value excluding background and text. The average of the display window is then set to substantially the calculated average. Alternately, brightness may be set automatically by setting an upper limit of a window at a brightest (highest) pixel value and setting a window lower limit at a dimmest (lowest) pixel value.

According to another embodiment of the present invention, computer program products is provided for normalizing contrast between two images having different contrast levels and for automatically setting brightness. The computer program products advantageously automate processes of the present invention, and facilitate comparison of images having different contrast levels. The computer program products also facilitate use of the digital reference images in a variety of industrial and manufacturing settings in a cost-effective manner.

BRIEF DESCRIPTION OF THE DRAWINGS

FIGS. 1-3 are digitized images of prior art film radiographs of porosity in aluminum;

FIGS. 4-6 are prior art digital radiographs with varying contrast settings of porosity in aluminum;

DETAILED DESCRIPTION OF THE INVENTION

By way of overview, embodiments of the present invention provide methodologies and systems to compare images with different levels of contrast. Contrast is normalized between the images with different contrast levels and brightness is set. According to an aspect of the present invention, when normalizing contrast a derivative of gray level is determined for a first digital image having a first contrast level, and a derivative of gray level is determined for a second digital image having a second contrast level that is greater than the first contrast level. A ratio of the derivative of gray level for the first digital image to the derivative of gray level for the second digital image is determined, and the derivative of gray level for the first digital image is equalized with the derivative of gray level for the second digital image. According to another aspect of the present invention, brightness may be set manually or automatically. The first digital image may be a digital reference image and the second digital image may be an image of a production part, such as a digital radiograph. Advantageously, embodiments of the present invention permit electronic digital reference images to be used with non-film x-ray inspection systems, such as digital radiography systems. As a result, use of the present invention can significantly reduce costs associated with set up time and costs associated with film, such as costs for film storage, processing, and chemical disposal. Moreover, embodiments of the present invention may be used to compare any digital images with different contrast levels—not just images obtained via radiography.

The present invention may be embodied in methods, computer software program products, and systems. Details of non-limiting examples of the various embodiments of the present invention will be set forth below.

Figure 7:
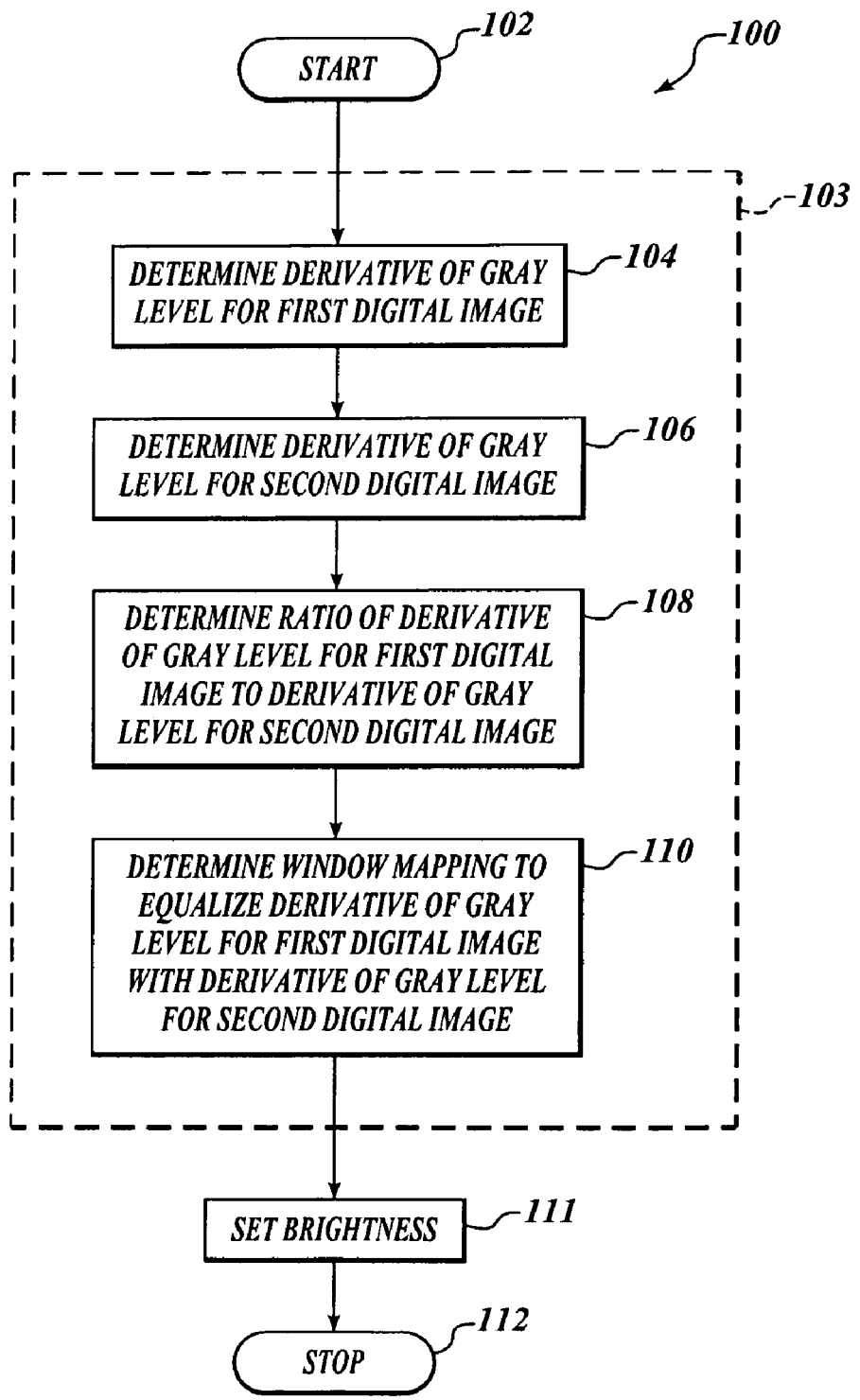
FIG. 7 is a flowchart of an exemplary, generalized method according to an embodiment of the present invention.

Referring to FIG. 7, a generalized method 100 for comparing images with different levels of contrast begins at a block 102. At a block 103, contrast is normalized between the images. At a block 104, a derivative of gray level is determined for a first digital image, such as a reference image, with a first contrast level. Any function may be performed that defines a derivative of the gray level, such as a logarithmic function or a polynomial fit function. Given by way of non-limiting example, the reference image may be a digital reference image such as a proposed ASTM E2422 reference image or the like. The derivative of gray level may be determined with respect to any variable as desired for a particular application. For example, the derivative of gray level may be determined with respect to thickness. The derivative may be determined with respect to thickness in applications such as, without limitation, radiography. As a further example, a variable used in determining a derivative may represent a mapping variable against a palette such as a gray scale. For example, an image may represent a mapping of temperature, altitude, density, or any other variable whatsoever as desired for a particular application. In those images, the derivative of gray scale is determined with respect to temperature, altitude, density, or whatever variable is used in the particular application.

At a block 106, a derivative of gray level is determined for a second digital image, such as without limitation a digital image of any production part that is imaged, with a second contrast level that is greater than the first contrast level. However, the second digital image may be any type of digital image whatsoever as desired for a particular application. As in the block 104, any function may be performed that defines a derivative of the gray level, such as a logarithmic function or a polynomial fit function. In one exemplary embodiment, a production part is digitally imaged by any type of digital modality as desired for a particular application. Given by way of non-limiting example, a suitable digital modality includes digital radiography. However, the digital radiography employed may include any of a wide range of technologies, including flat panel technologies, computed radiography, and a variety of scintillator and digital camera-based technologies. As in the block 104, the derivative of gray level may be determined with respect to any variable as desired for a particular application. In the examples of digital modalities discussed for the block 106, the derivative of gray level may be determined with respect to thickness. However, as in the block 104, in other applications the derivative of gray scale is determined with respect to temperature, altitude, density, or whatever variable is used in the particular application.

At a block 108, a ratio is determined of the derivative of gray level for the first digital image to the derivative of gray level for the second digital image. Any function may be performed that defines a derivative of the gray level versus thickness, such as a logarithmic function or a polynomial fit function. At a block 110, the derivative of gray level for the first digital image is equalized with the derivative of gray level for the second digital image. In one non-limiting embodiment, equalization is performed by determining a window mapping. The window mapping is applicable to logarithmic gray scales and linear gray scales. Alternately, a mapping may be made to a look-up-table, such as a non-uniform look-up-table, that has been empirically predetermined.

After contrast between the first digital image second digital image has been normalized at the block 103, it may be desirable to adjust brightness of at least one of the images before an operator makes a comparison between the images. Adjusting brightness may help an operator compare the images. Typically, it is desirable to adjust brightness of the image with lower contrast (in this case, the first digital image).

At a block 111, brightness is adjusted either manually or automatically. Brightness setting may be adjusted manually in software by adjusting window level.

Alternately, at the block 111 brightness of either image or both images may be adjusted automatically as desired. For example, an upper limit of a window may be set at a brightest (highest) pixel value and a window lower limit may be set at a dimmest (lowest) pixel value. Alternately, brightness can be set automatically by calculating an average pixel value excluding background and text, and setting the average of the display window to the calculated average pixel value. The background and text can be excluded by excluding pixel values that are known to be pixel values of background or text. Typically, extreme pixel values at the lowest and highest ends in the data range in an n-bit image (that is, 0 and $2^n$) are used for background or text. For example, in a sixteen bit image the background is often set to either zero (0) or 65,535 and the text is often set to either 65,535 or zero (0), respectively. This approach ensures that the text is legible against the background regardless of the contrast and brightness settings in use. The brightness is then set such that the average of the display window is set to the average pixel value calculated after text and background have been excluded. The brightness need not be set to exactly the calculated average pixel value. The brightness may be set to approximately or substantially the calculated average pixel value. For example, the average of the display window may be set to within plus-or-minus around one-half of the display window width, or as desired for a particular application.

With contrast normalized between the first and second images and brightness set as desired, an operator can make a comparison between the first and second images. The method 100 ends at a block 112.

Figure 8:
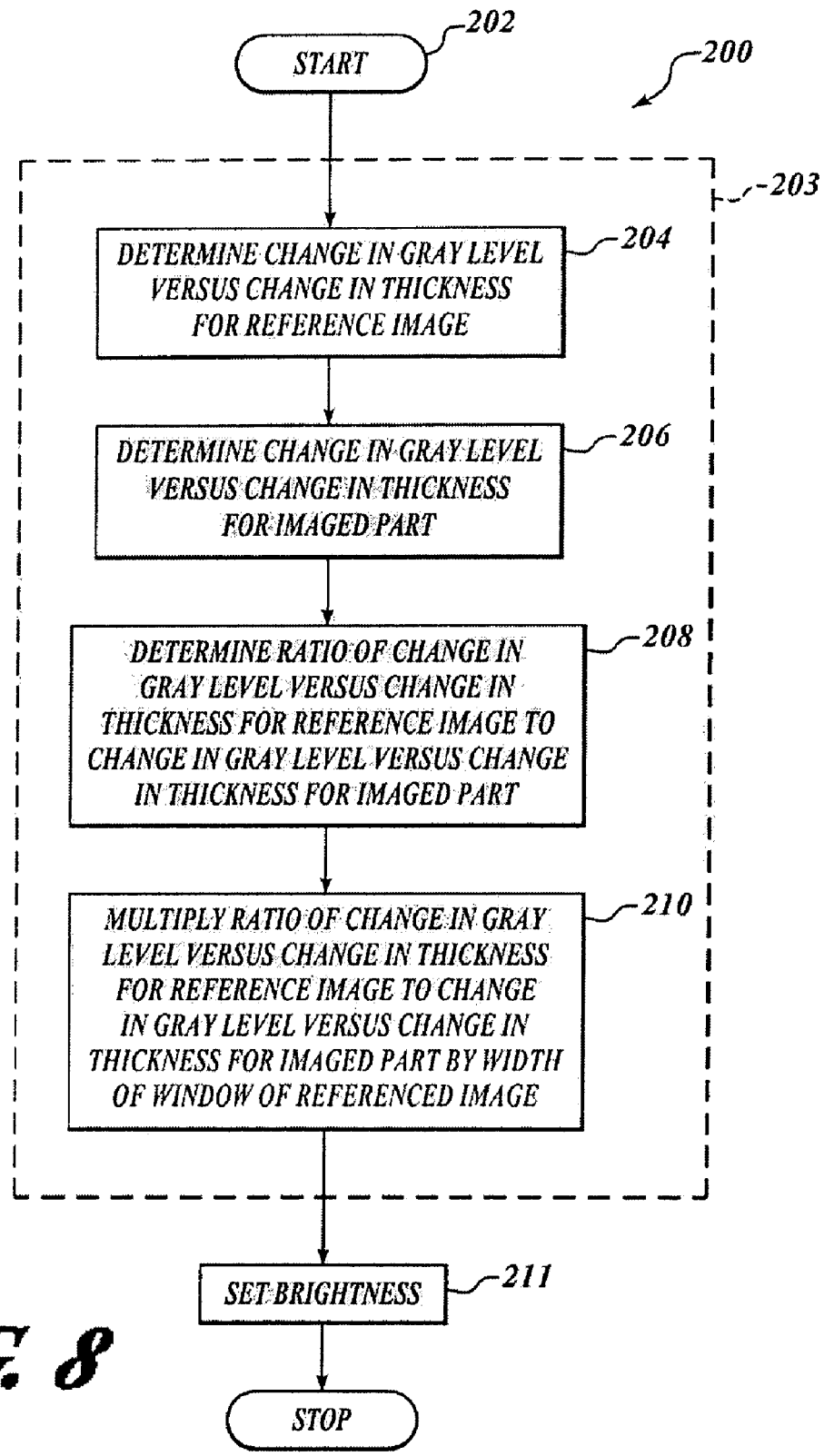
FIG. 8 is a flowchart of details of the method shown in FIG. 7.

Referring now to FIG. 8, a method 200 implements one presently preferred embodiment of the generalized method 100 (FIG. 7) for comparing a first image having a first contrast level, such as reference image, and a second image having a second contrast level that is greater than the first contrast level, such as a production digital image of an imaged part. The method 200 begins at a block 202. At a block 203, contrast is normalized between the images. At a block 204, a change in gray level versus a change in another variable, such as thickness, is determined for a reference image having a first contrast level. The variable may be selected as desired for a particular application as discussed above for the block 104 (FIG. 7). Because a change in gray value versus the change in the variable, such as thickness, in the reference image stays the same for each reference image, this value or function advantageously is calculated once and is referred to for each normalization using that reference image. Similar to the reference image discussed above for the block 104 (FIG. 7), the reference image may include without limitation an ASTM E2422 reference image or the like.

At a block 206, a change in gray level versus a change in the variable, such as thickness, is determined for a second image having a second contrast level that is greater than the first contrast level, such as a digital image of an imaged part. The variable may be selected as desired for a particular application as discussed above for the block 106 (FIG. 7). The change in gray level is calculated using at least two known thicknesses of a known material that are close to or that bracket the thickness of interest. Given by way of non-limiting example, the imaged part may be an aluminum casting. However, the part may include any type of part fabricated by any fabrication technique as desired for a particular application.

At a block 208, a ratio of the change in gray level versus change in the variable for the reference image to the change in gray level versus change in the variable for the imaged part is determined. At a block 210, the ratio of the change in gray level versus change in the variable for the reference image to the change in gray level versus change in the variable for the imaged part is multiplied by a width of a window of the reference image. Multiplying the window width of the image with the lower contrast level by the ratio determines a window mapping to equalize the change in gray level for the image with the lower contrast level to the change in gray level for the image with the higher contrast level. As a result, contrast is normalized between the reference image and the digital image of the imaged part. This permits an operator to compare the digital image of the imaged part to the reference image, thereby facilitating a grading of severity of any defects, such as porosity, that may be present in the imaged part.

As discussed above for the block 111 (FIG. 7), in some cases it may be desirable to adjust brightness setting of at least one of the images before a comparison is made by an operator. Typically, it may be desirable to adjust the brightness setting of the image with the lower contrast level. At a block 211, brightness setting is adjusted as desired either manually or automatically in a manner as described at the block 111 (FIG. 7).

With contrast normalized between the first and second images and brightness set as desired, an operator can make a comparison between the first and second images. The method 200 ends at a block 212.

Figure 9:
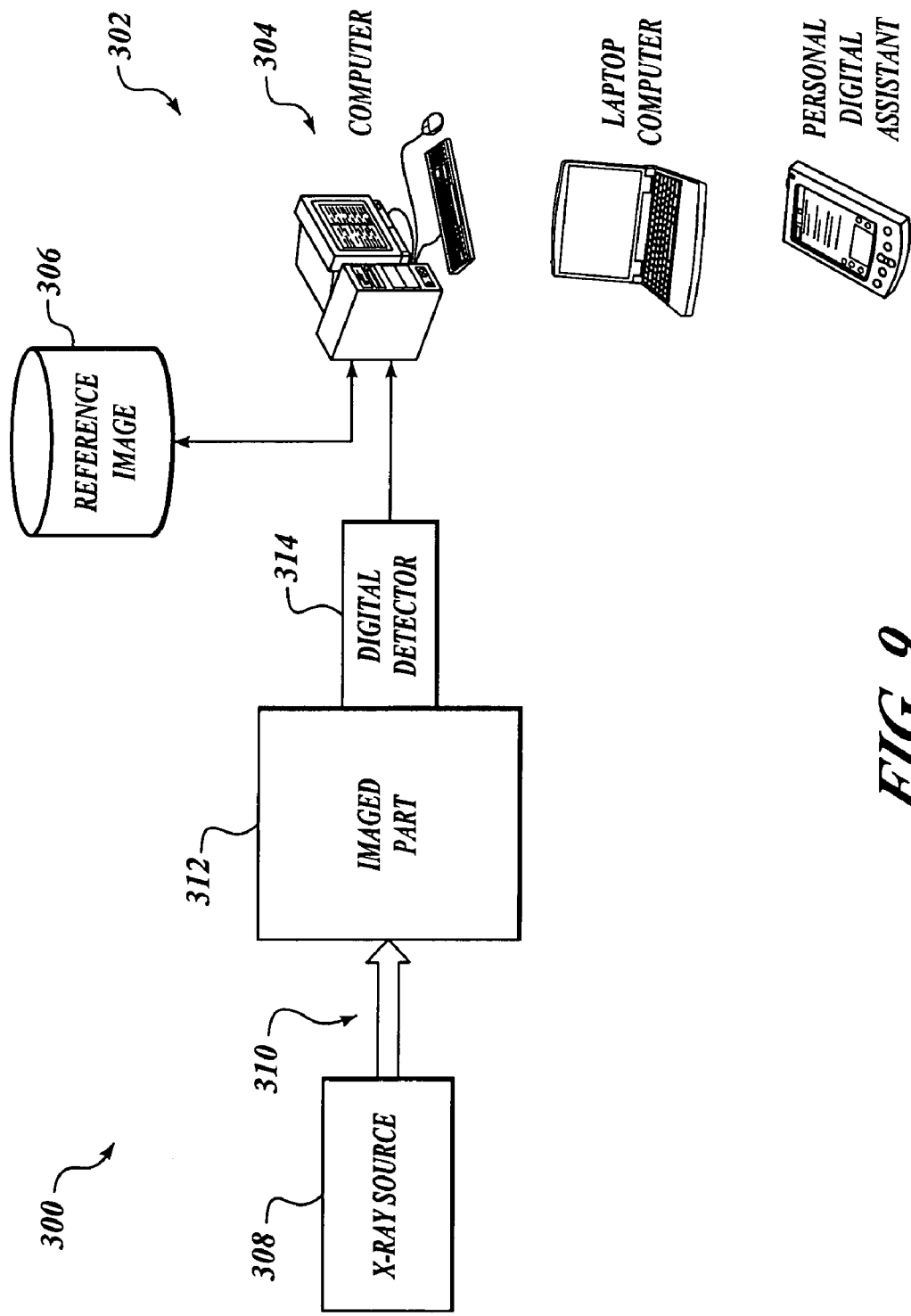
FIG. 9 is a block diagram of an exemplary host environment for embodiments of the present invention.

Referring now to FIG. 9, an exemplary host environment 300 may be used to host a system 302 for normalizing contrast between digital images, and/or adjusting brightness setting of the digital images, and/or comparing the digital images. The system 302 advantageously performs the method 100 (FIG. 7) or the method 200 (FIG. 8), as desired. In one exemplary embodiment, the system 302 includes a computer 304, such as a personal computer, a desktop computer, a mainframe computer, a workstation, a laptop computer, a palm top computer, a personal digital assistant, or the like. The system 302 also includes storage media 306 that stores digital reference images. The storage media 306 may include any acceptable storage media, such as an internal hard drive, an external hard drive, optical disk storage, CD-ROM, DVD, floppy disk, or the like.

In one exemplary environment, a digital radiograph of a part is made and the digital radiograph is provided to the system 302. In a known manner, an x-ray source 308 produces x-rays 310 that image a part 312. A digital detector 314 detects an image of the part 312. As discussed above, the digital radiography employed may include any of a wide range of technologies, including flat panel technologies, computed radiography, and a variety of scintillator and digital camera-based technologies. The digital detector 314 provides a digital image of the image part 312 to the computer 304. However, the digital image provided to the computer 304 may be any type of digital image whatsoever as desired for a particular application.

Figure 10:
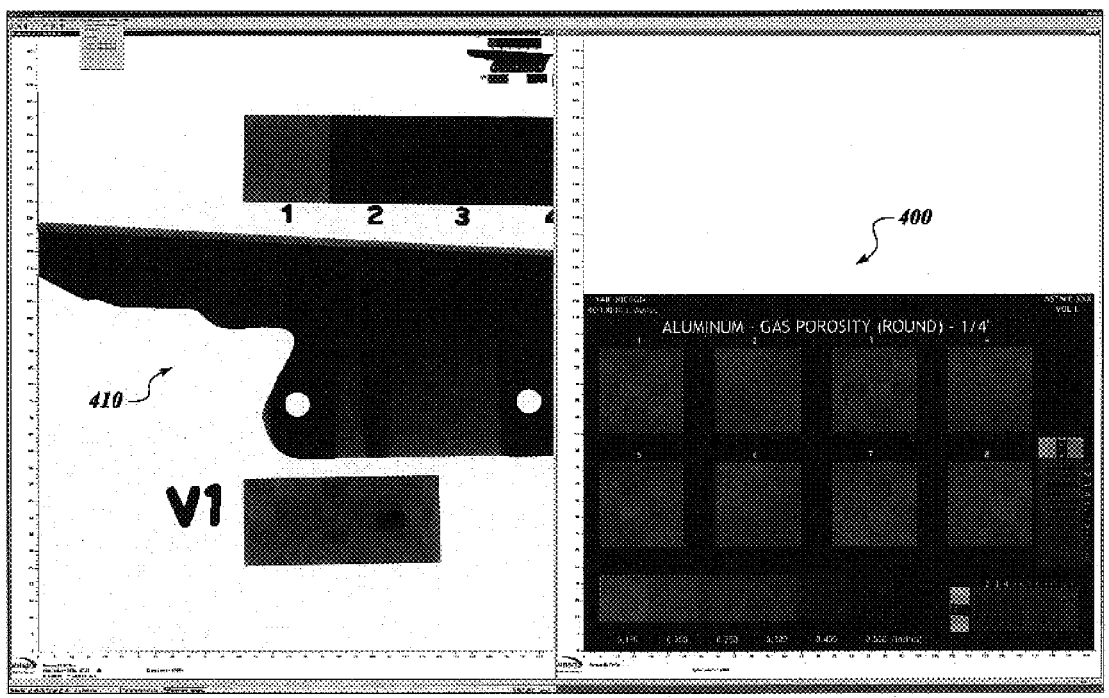
FIGS. 10-13 are screen shots from an exemplary computer software program product that implements the methods of FIGS. 7 and 8.

Referring now to FIGS. 10-13, a computer software program product is executed by the computer 304 (FIG. 9) to perform the methods 100 or 200 (FIGS. 7 and 8). Referring to FIG. 10, two screens 400 and 410 are shown side-by-side. The screens 400 and 410 may be displayed on the same monitor or on separate monitors, as desired. The screen 400 shows a reference image. Given by way of non-limiting example, the reference image is for gas porosity defects in ¼ inch thick aluminum. The reference image includes eight plates for grading severity of defects and a step wedge with thicknesses of 0.150 in., 0.200 in., 0.250 in., 0.300 in., 0.400 in., and 0.500 in. The screen 410 shows a digital radiograph of an imaged part. Given by way of non-limiting example, the part shown is an aluminum cast angle bracket. The imaged part includes two areas of porosity defects, appearing as foamy or bubbly regions in gray areas of the part. These areas of porosity defects in the digital radiograph will be compared to the reference image.

A pulldown menu under "digital radiography" includes selections for "statistics for DR line plot", "DR line plot", "pixel size", "contrast calibration ¼", and "contrast calibration ¾". The "statistics for DR line plot" and "DR line plot" selections each select a line and generate a line plot. The "pixel size" selection allows size of a pixel to be input and allows point-to-point measurements to be made. The "contrast calibration ¼" selects thickness of material, such as without limitation aluminum, between 0-½ inch for which contrast is to be normalized. Also, thickness of the plates shown in the reference image are set to ¼ inch. Similarly, the "contrast calibration ¾" selects thickness of material, such as without limitation aluminum, between ½-2 inch for which contrast is to be normalized. Also, thickness of the plates shown in the reference image are set to ¾ inch. The part in this example is less than ½ inch thick, so "contrast calibration ¼" is selected.

Figure 11:
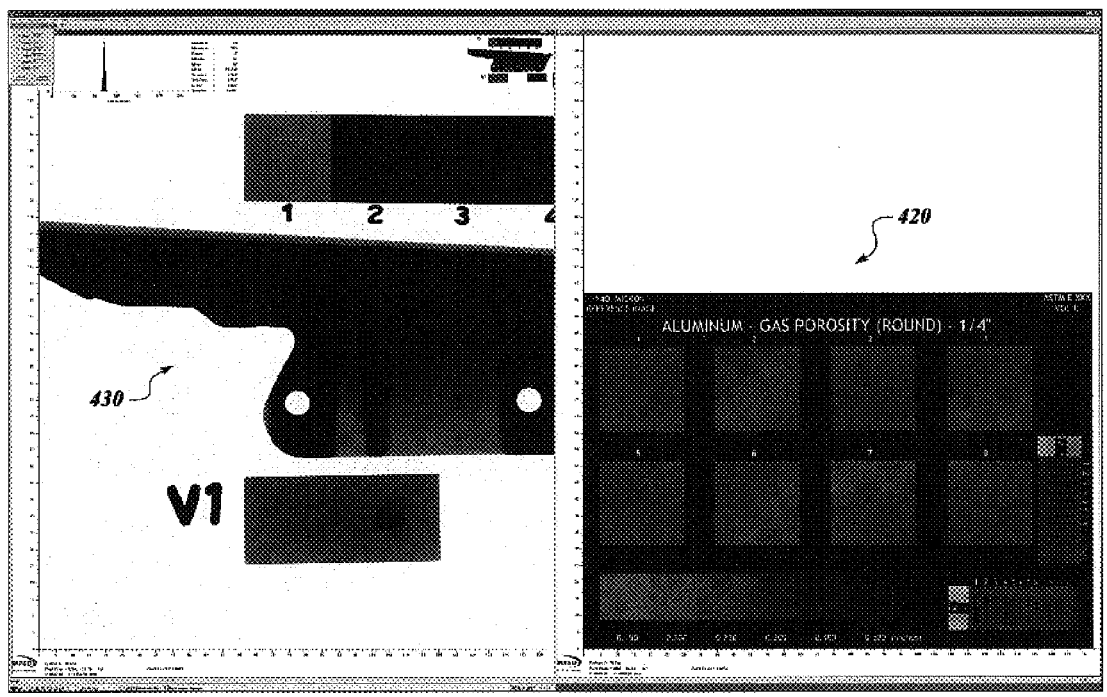

When "contrast calibration ¼" is selected, screens 420 and 430 of FIG. 11 are generated. A "step 1" radio button is clicked and a box is drawn, such as by clicking and dragging with a mouse, in the step 1 bracketing thickness of the screen 430. Pixels in the drawn box are analyzed for statistics. The statistic of interest is the mean gray level value for the step 1 thickness of 0.150 in. This is because the mean gray level value and the step 1 thickness of 0.150 in. will be used to calculate the change in gray level value or derivative of gray level value versus thickness.

Figure 12:
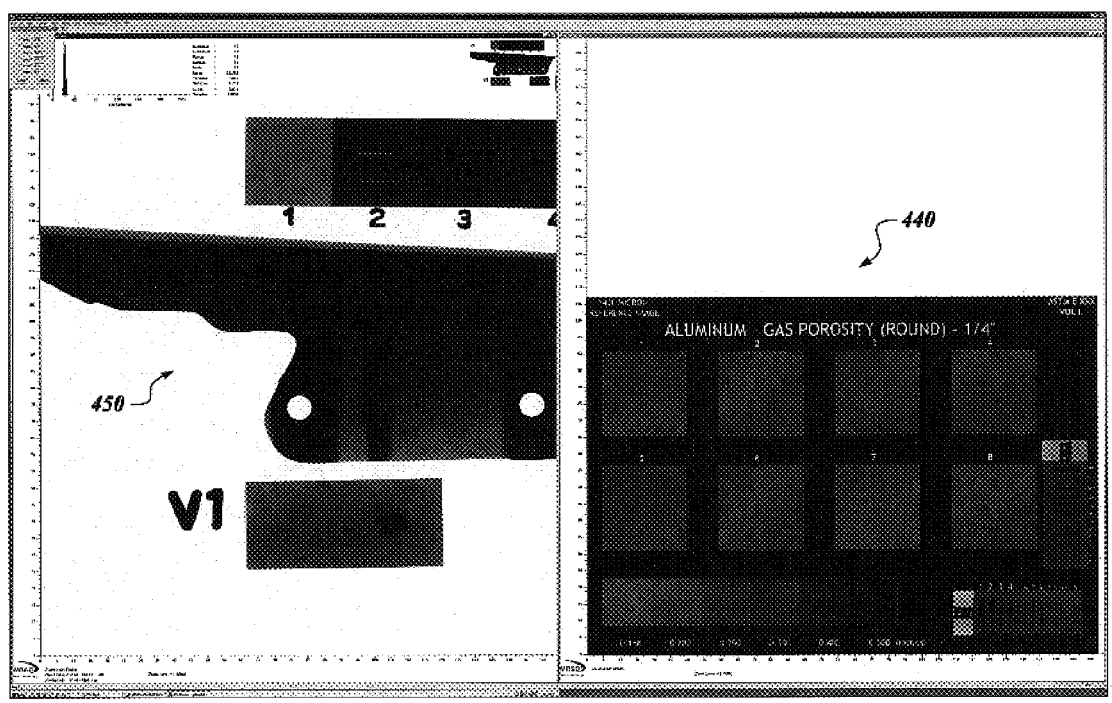

A "step 2" radio button is clicked to select the next bracketing thickness, and screens 440 and 450 of FIG. 12 are generated. A box is drawn in the step 2 thickness of the screen 450. Pixels in the drawn box are analyzed for statistics. Again, the statistic of interest is the mean gray level value for the step 2 thickness of 0.200 in.

Figure 13:
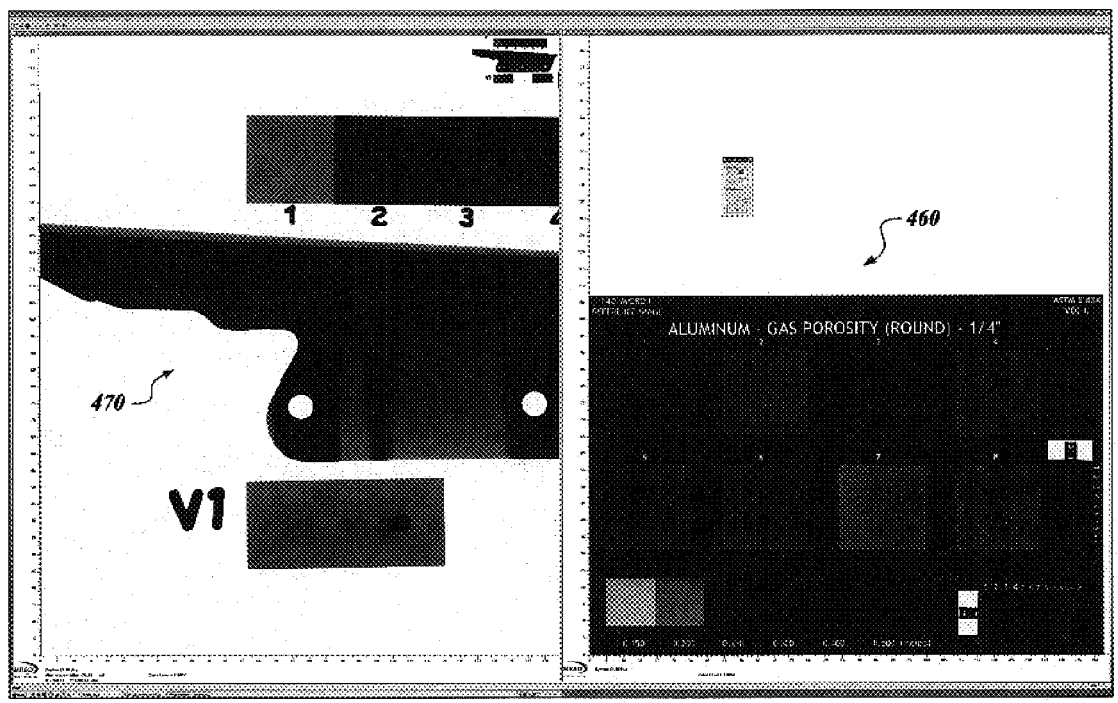

A "calibrate" button is clicked, and screens 460 and 470 of FIG. 13 are generated. The screen 460 represents the reference image and the screen 470 represents the digital radiograph of the imaged part. When the "calibrate" button is clicked, the changes in the mean gray level for step 1 and step 2 are calculated for the screens 460 and 470 and divided by the change in thickness between the step 1 thickness and the step 2 thickness for the screens 460 and 470, respectively. A ratio is determined by dividing the result for the screen 460 by the result for the screen 470. As described above for the method 200 (FIG. 8), this ratio is multiplied by width of the window for the reference image (that is, the screen 460). As a result, contrast between the digital radiograph of the imaged part shown in the screen 470 is normalized with contrast for the reference image shown in the screen 460. This contrast normalization is notably perceived by comparison of the eight plates shown in the screen 440 (FIG. 12) with the eight plates shown in the screen 460. In the non-limiting example shown, porosity defects shown in the screen 470 are comparable with porosity defects shown in either plate 3 or plate 4 of the reference image shown in the screen 460. Such a comparison could not be performed without normalization of contrast between the digital radiograph and the reference image. For example, referring briefly back to FIG. 12, a comparison between the digital radiograph shown in the screen 450 with any of the eight plates shown in the reference image of the screen 440 would be meaningless. Advantageously, as a result of normalization of contrast between the digital radiograph and the reference image, a direct comparison between the digital radiograph and the reference image can now be made.

Typically, computer program instructions may be loaded onto the computer or other programmable apparatus to produce a machine, such that the instructions which execute on the computer or other programmable apparatus create means for implementing the functions specified in the flowcharts or screen shot block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or screen shot block(s) or step(s). The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the flowchart or screen shot block(s) or step(s).

Accordingly, blocks or steps of the flowchart or screen shot illustrations support combinations of means for performing the specified functions and program instruction means for performing the specified functions. It will also be understood that each block or step of the flowchart or screen shot illustrations, and combinations of blocks or steps in the flowchart or screen shot illustrations, can be implemented by special purpose hardware-based computer systems which perform the specified functions or steps, or combinations of special purpose hardware and computer instructions.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of normalizing contrast between digital images, the method comprising:
   using a computer to:
      determine a derivative of gray level for a first digital image having a first contrast level;
      determine a derivative of gray level for a second digital image having a second contrast level that is greater than the first contrast level;
      determine a ratio of the derivative of gray level for the first digital image to the derivative of gray level for the second digital image; and
      equalize the derivative of gray level for the first digital image with the derivative of gray level for the second digital image by determining a window mapping, wherein determining the window mapping includes multiplying the ratio of the derivative of gray level for the first digital image to the derivative of gray level for the second digital image by a width of a window of the first digital image.

2. The method of claim 1, wherein to equalize the derivative of gray level for the first digital image with the derivative of gray level for the second digital image includes accessing a look-up table.

3. The method of claim 2, wherein the look-up table is non-linear.

4. The method of claim 1, wherein to determine the derivative determines a function that defines a derivative, the function including one of a logarithmic function and a polynomial fit function.

5. The method of claim 1 wherein to determine the derivative determines a derivative with respect to thickness.

6. A system for normalizing contrast between digital images, the system comprising:
   a storage device configured to store at least a first digital image having a first contrast level;
   an input interface configured to input at least a second digital image having a second contrast level that is greater than the first contrast level; and
   a processor including:
      a first component configured to determine a derivative of gray level for the first digital image;
      a second component configured to determine a derivative of gray level for the second digital image;
      a third component configured to determine a ratio of the derivative of gray level for the first digital image to the derivative of gray level for the second digital image; and
      a fourth component configured to determine a window mapping to equalize the derivative of gray level for the first digital image with the derivative of gray level for the second digital image, wherein the fourth component is further configured to determine the window mapping by multiplying the ratio of the derivative of gray level for the first digital image to the derivative of gray level for the second digital image by a width of a window of the first digital image.

7. The system of claim 6, wherein the fourth component is further configured to access a look-up table.

8. The system of claim 7, wherein the look-up table is non-linear.

9. The system of claim 6, wherein the first and second components are further configured to determine a function that defines a derivative, the function including one of a logarithmic function and a polynomial fit function.

10. The system of claim 6, wherein the first and second components are further configured to determine a derivative with respect to thickness.

11. A computer-readable storage medium for normalizing contrast between digital images, comprising:
   first computer software program code means for determining a derivative of gray level for a first digital image having a first contrast level;
   second computer software program code means for determining a derivative of gray level for a second digital image having a second contrast level that is greater than the first contrast level;
   third computer software program code means for determining a ratio of the derivative of gray level for the first digital image to the derivative of gray level for the second digital image; and
   fourth computer software program code means for equalizing the derivative of gray level for the first digital image with the derivative of gray level for the second digital image, wherein the fourth computer software program code means is configured to determine a window mapping by multiplying the ratio of the derivative of gray level for the first digital image to the derivative of gray level for the second digital image by a width of a window of the first digital image.

12. The computer-readable storage medium of claim 11, wherein the fourth computer software program code means is further configured to access a look-up table.

13. The computer-readable storage medium of claim 12, wherein the look-up table is nonlinear.

14. The computer-readable storage medium of claim 11, wherein the first and second computer software program code means are further configured to determine a function that defines a derivative, the function including one of a logarithmic function and a polynomial fit function.

15. The computer-readable storage medium of claim 11, wherein the first and second computer software program code means are further configured to determine a derivative with respect to thickness.

16. A method of normalizing contrast between digital images, the method comprising:
using a computer to:
determine a derivative of gray level for a first digital image having a first contrast level by determining a first function that defines the derivative of gray level for the first digital image, the first function including one of a logarithmic function and a polynomial fit function;
determine a derivative of gray level for a second digital image having a second contrast level by determining a second function that defines the derivative of gray level for the second digital image, the second function including one of a logarithmic function and a polynomial fit function, wherein the second contrast level is greater than the first contrast level;
determine a ratio of the derivative of gray level for the first digital image to the derivative of gray level for the second digital image; and
equalize the derivative of gray level for the first digital image with the derivative of gray level for the second digital image.

17. The method of claim 16, wherein to equalize the derivative of gray level for the first digital image with the derivative of gray level for the second digital image includes accessing a look-up table.

18. The method of claim 17, wherein the look-up table is non-linear.

19. The method of claim 16, wherein to determine the derivative determines a derivative with respect to thickness.

20. A system for normalizing contrast between digital images, the system comprising:
a storage device configured to store at least a first digital image having a first contrast level;
an input interface configured to input at least a second digital image having a second contrast level that is greater than the first contrast level; and
a processor including:
a first component configured to determine a derivative of gray level for the first digital image by determining a first function that defines the derivative of gray level for the first digital image, the first function including one of a logarithmic function and a polynomial fit function;
a second component configured to determine a derivative of gray level for the second digital image by determining a second function that defines the derivative of gray level for the second digital image, the second function including one of a logarithmic function and a polynomial fit function;
a third component configured to determine a ratio of the derivative of gray level for the first digital image to the derivative of gray level for the second digital image; and
a fourth component configured to equalize the derivative of gray level for the first digital image with the derivative of gray level for the second digital image.

21. The system of claim 20, wherein the fourth component is further configured to access a look-up table.

22. The system of claim 21, wherein the look-up table is non-linear.

23. The system of claim 20, wherein the first and second components are further configured to determine a derivative with respect to thickness.

24. A computer-readable storage medium for normalizing contrast between digital images, comprising:
first computer software program code means for determining a derivative of gray level for a first digital image having a first contrast level;
second computer software program code means for determining a derivative of gray level for a second digital image having a second contrast level that is greater than the first contrast level, wherein the first and second computer software program code means are further configured to determine a function that defines a derivative, the function including one of a logarithmic function and a polynomial fit function;
third computer software program code means for determining a ratio of the derivative of gray level for the first digital image to the derivative of gray level for the second digital image; and
fourth computer software program code means for equalizing the derivative of gray level for the first digital image with the derivative of gray level for the second digital image.

25. The computer-readable storage medium of claim 24, wherein the fourth computer software program code means is further configured to determine a window mapping.

26. The computer-readable storage medium claim 25, wherein the fourth computer software program code means is configured to determine a window mapping by multiplying the ratio of the derivative of gray level for the first digital image to the derivative of gray level for the second digital image by a width of a window of the first digital image.

27. The computer-readable storage medium of claim 24, wherein the fourth computer software program code means is further configured to access a look-up table.

28. The computer-readable storage medium of claim 27, wherein the look-up table is nonlinear.

29. The computer-readable storage medium of claim 24, wherein the first and second computer software program code means are further configured to determine a derivative with respect to thickness.

* * * * *